US008851859B2

(12) United States Patent
Moestrup (10) Patent No.: US 8,851,859 B2
(45) Date of Patent: Oct. 7, 2014

(54) NACELLE STAND AND A METHOD FOR ASSEMBLING AND TESTING A NACELLE FOR A WIND TURBINE

(71) Applicant: Envision Energy (Denmark) ApS, Silkeborg (DK)

(72) Inventor: Henning Moestrup, Viborg (DK)

(73) Assignee: Envision Energy (Denmark) ApS, Wilkeborg (DK)

( * ) Notice: Subject to any disclaimer, the term of this patent is extended or adjusted under 35 U.S.C. 154(b) by 0 days.

(21) Appl. No.: 13/788,804

(22) Filed: Mar. 7, 2013

(65) Prior Publication Data
US 2013/0236304 A1    Sep. 12, 2013

(30) Foreign Application Priority Data
Mar. 9, 2012   (DK) .................................. 2012 70107

(51) Int. Cl.
  *F01D 25/24*   (2006.01)
  *F03D 11/00*   (2006.01)
  *F03D 1/00*    (2006.01)

(52) U.S. Cl.
  CPC ................ *F01D 25/24* (2013.01); *F03D 11/00* (2013.01); *Y02E 10/728* (2013.01); *F03D 1/005* (2013.01); *F05B 2260/83* (2013.01); *F03D 1/001* (2013.01); *Y02E 10/722* (2013.01); *F05B 2240/14* (2013.01)
  USPC ....................................................... 416/246

(58) Field of Classification Search
  CPC ..... F03D 1/005; F03D 1/0691; F03D 11/005; F03D 11/0075; F03D 11/04; F03D 11/00
  USPC .................................. 416/246, 244 R, DIG. 6
  See application file for complete search history.

(56) References Cited

U.S. PATENT DOCUMENTS

| 7,178,406 | B2 | 2/2007 | Gonzalez et al. |
| 7,793,964 | B2 | 9/2010 | Christensen et al. |
| 8,087,896 | B2 | 1/2012 | Pederson |
| 2005/0172729 | A1* | 8/2005 | Gonzalez et al. ............... 73/856 |
| 2011/0260428 | A1 | 10/2011 | Pedersen |

FOREIGN PATENT DOCUMENTS

| EP | 1 564 405 A1 | 8/2005 |
| WO | 03/071130 A1 | 8/2003 |
| WO | 2008/000267 A1 | 1/2008 |
| WO | 2010/066255 A1 | 6/2010 |
| WO | 2010/069611 A1 | 6/2010 |

\* cited by examiner

*Primary Examiner* — Christopher Verdier
*Assistant Examiner* — Brian O Peters
(74) *Attorney, Agent, or Firm* — Roberts Mlotkowski Safran & Cole, P.C.; David S. Safran

(57) ABSTRACT

A nacelle stand and a method for building and testing a nacelle for a wind turbine using a nacelle stand, the nacelle stand being suitable for supporting a nacelle for a wind turbine, during manufacturing and assembly of the nacelle, testing and transport. The nacelle stand has a connecting arrangement for rigid connection to a yaw system arranged at the main frame of the nacelle, a midsection, a horizontal bedplate and a center part with a number of fingers extending away from the center part in a horizontal plane, the fingers each having an angle larger than 0 degrees and less than 90 degrees relative to a longitudinal axis of the stand.

14 Claims, 9 Drawing Sheets

NACELLE STAND AND A METHOD FOR ASSEMBLING AND TESTING A NACELLE FOR A WIND TURBINE

BACKGROUND OF THE INVENTION

1. Field of the Invention

The present invention relates to a nacelle stand and to a method for building and testing a nacelle for a wind turbine using a nacelle stand, the nacelle stand being suitable for supporting a nacelle for a wind turbine, during manufacturing and assembly of the nacelle, and during transport, the nacelle comprising a main frame suitable for installation of a number of components such as, e.g., a generator, a main shaft, a hub comprising a number of blades and a yaw system, the nacelle stand having a longitudinal axis and a traverse axis and comprising connecting means/a flange, arranged for rigid connection to the yaw system arranged at the main frame of the nacelle, the nacelle further comprising a nacelle cover extending over the main frame and over other items installed on the main frame.

2. Description of Related Art

It is well known that a nacelle for a modern wind turbine is a big and heavy construction and that during construction, assembly and transport of nacelles for modern wind turbines some challenges exist.

Firstly, the nacelle needs some kind of fixture to support the nacelle during assembling and typically a steel structure designed to this purpose is used in the workshop. After assembling the nacelle, it is typically transported by truck on a flatbed trailer. In order to make a safe transport without stressing the nacelle, it will normally be hoisted onto the trailer by a crane and fixed to the trailer.

As the turbines grow larger and larger so do the nacelles and road transport becomes a bigger challenge, especially due to the height of the nacelle and the trailer. In order to still be able to transport a nacelle by truck and under bridges, special trailers are used where the nacelle is resting on a very low flatbed. From International Patent Application Publication WO 03 071130 A1 and corresponding U.S. Pat. No. 7,793,964, a solution where the nacelle connects the front and the rear end of the trailer is known, where a skid plate is installed under the nacelle having only a very small clearance to the ground. This arrangement is not attractive as the nacelle is carried at the hub and at the main frame which is not designed to carry the weight of the nacelle. By arranging the nacelle this way, unwanted stresses and distortion of the various parts of the nacelle can occur which might damage the nacelle.

From International Patent Application Publication WO 2008/000267 A1 and corresponding U.S. Pat. No. 8,087,896, a jack up solution is known where a number of hydraulic actuators are fixated to the frame of the nacelle. When activating the hydraulic actuators, a linear force is exerted and the nacelle can be raised or lowered in relation to the ground or a flatbed trailer. The document teaches that this way there is no need for a crane at the erection site as the nacelle can be unloaded without a crane. This is however not a problem as the nacelle will still need to be hoisted to the top of the tower, and thus a crane will be present at some time during installation and erection of the wind turbine. Further, the system of WO 2008/000267 A1 and U.S. Pat. No. 8,087,896 is installed at the periphery of the main frame of the nacelle and teaches that a wobbling of the main frame of the nacelle might occur which is highly unwanted. Further, nothing in the mentioned document teaches anything about handling of the nacelle during assembly and testing.

International Patent Application Publication WO 2010/066255 A1 and U.S. Patent Application Publication 2011/260,428 also address the problem of transporting a nacelle for a wind turbine. This is addressed by having a frame with two parallel arms extending in the longitudinal direction of the nacelle and by having an inclined flange for engagement with the yaw system of the nacelle. The inclination of the flange counteracts the designed inclination of the nacelle where the main shaft that carries the hub and the rotor blades typically is inclined to ensure a certain distance between the tip of the rotor blades and the tower of the wind turbine. By having the flange inclined, the load on a trailer will be lower as the top of this specific nacelle design will be more or less horizontal, and thus the complete transport will possibly have a height allowing it to pass under certain bridges. The frame is designed to slide into tracks on a trailer and can thus be transported with only a minimum of clearance to the ground.

European Patent Application EP 1 564 405 A1 and corresponding U.S. Pat. No. 7,178,406 describe a solution for fatigue and maximum load testing of structural element of a wind turbine. A very solid and absolutely as rigid as possible, test bed is disclosed where, e.g., a mainframe for a wind turbine can be installed and stress tested, e.g., during development.

The test bed comprises a reinforced concrete foundation having means for installation of a cylindrical support structure. The item to be tested is mounted to the support structure and dynamic or static loads are applied in order to stress test the construction.

The test bed described in this document is thus a test bed for use during development and certainly not a bed for supporting a nacelle during assembly of the nacelle, or for carrying out some funtionality tests during assembly, and further for supporting the nacelle all the way thru production and finally to the erection site, from where it can be returned for repeated use. Several issues of the test bed as described in EP 1 564 405 A1 and corresponding U.S. Pat. No. 7,178,406 make it unuseful, but mainly the construction comprising a very solid, heavy and large concrete foundation makes it directly impossible to make use of the test bed during assembly and also during transport of the nacelle.

As nacelles are becoming larger and larger due to the overall power output of a modern wind turbine and as the type of generators used are subject to change, the weight of a typically nacelle can easily be more than 200 metric tons and can easily have a diameter or height of up to eight meters or more. Such a nacelle cannot be manufactured, assembled and finally transported and installed without serious challenges.

None of the known solutions address the problems of assembling, testing and transporting a nacelle for a modern megawatt wind turbine on a single nacelle stand that will follow the nacelle from the early assembling steps to installation at a tower at an erection site.

SUMMARY OF THE INVENTION

It is a primary object of the invention to provide a nacelle stand that makes manufacturing, assembly and transport of a large nacelle for a wind turbine possible, the nacelle having a weight of more than 150 metric tons, e.g., 200 or even 250 metric tons.

As mentioned above, the invention relates to a nacelle stand and to a method for building and testing a nacelle for a wind turbine using a nacelle stand, the nacelle stand being suitable for supporting a nacelle for a wind turbine, during manufacturing and assembly of the nacelle, and during transport, the nacelle comprising a main frame suitable for installation of a number of components such as, e.g., a generator, a main shaft, a hub comprising a number of blades and a yaw system, the nacelle stand having a longitudinal axis and a traverse axis and comprising connecting means/a flange, arranged for rigid connection to the yaw system arranged at the main frame of the nacelle, the nacelle further comprising a nacelle cover extending over the main frame and over other items installed on the main frame.

A nacelle stand according to the invention further comprises at least a midsection having a vertical centerline, the midsection being arranged between the connecting means/flange and a bedplate, the bedplate extending in a first horizontal plane and comprising a center part and a number of fingers extending away from the center part in the first horizontal plane, and the fingers each having an angle larger than 0 degrees and less than 90 degrees to the first longitudinal axis. As the nacelle stand is designed to carry a nacelle that easily can have a weight of 200 to 230 metric ton or even more, it is very important to secure the nacelle and the nacelle stand by having a rather wide support face which is obtained by the above mentioned fingers.

The weight of a nacelle stand according to the invention which is designed to be used for a nacelle with a weight of approximately 200 metric ton has a weight of approximately 30 metric ton and will typically be constructed in steel.

By having the fingers extending in directions as described above, the load is distributed over a rather large area, and thus a very stable support is obtained. No matter if the nacelle and nacelle stand is transported by truck or by ship or any other means suitable for such a transport, a very stable and safe transport can be carried out. Typically, the nacelle stand will be welded to a trailer or a deck of a ship during transport, but it can be fastened by bolting and/or lashing also or by any other suitable means.

One other very important feature is that, by using a nacelle stand as described, it is especially suitable to use during assembly and testing of a nacelle and its components. Arranging the nacelle stand in a workshop and practically building and testing the many different parts of the nacelle directly on the nacelle stand gives quite a few benefits. The fingers that extend from the center part give a good support, even if the nacelle stand is somewhat out of balance during assembly of, e.g., the generator that evidently will make the nacelle heavy in the rear end when the hub and rotor blades are still not installed. As there is a good and sufficient support from the fingers, the mainframe of the nacelle can be rotated at the yaw bearings for test and still be sufficiently supported.

A nacelle stand according to the invention can comprise two set of fingers, each set of fingers extending from the vertical centerline of the midsection. The fingers have, in a preferred embodiment of the invention, a length that ensures that the fingers do not extend outside the width of the nacelle when installed on the nacelle stand.

A nacelle stand according to the invention can further comprise at least one further set of fingers, the further set of fingers comprising at least two fingers, each of the fingers extending away from the center part and each finger having a longitudinal axis, where the longitudinal axis of each of the fingers intersect the centerline of the midsection or intersect the longitudinal axis of the nacelle stand at a location behind the centerline compared to the direction of the extension of the fingers. This means that the further set of fingers is arranged with an angle equal to or less than 45 degrees to the longitudinal axis.

In one embodiment of the invention, the nacelle stand comprises not only one but two further sets of fingers, where one set of fingers is arranged pointing mainly in the same direction as the front end of the nacelle and another set of fingers is arranged pointing mainly in the direction of the rear end of the nacelle, when the nacelle is aligned on the nacelle stand as seen in the figures below. In a preferred embodiment, the nacelle stand has a set of longer fingers pointed in the same direction as the front of the nacelle. As the fingers intersect the longitudinal axis of the nacelle stand behind the vertical centerline, the nacelle stand allows for a front or back heavy load during assembly of the nacelle. As the center of gravity of the nacelle stand and the parts installed thereon will change due to the sequence of installing the different parts—generator, hub, inner blade parts, outer blade parts, the different fingers extending from the center part will not be loaded evenly during assembly. Due to the design with the fingers extending from a center part, the nacelle stand is capable of taking up such uneven loads during assembly. During the final assembly of the rotor blades to the hub at the nacelle, crane support might be needed to prevent the complete installation from becoming too front heavy. During installation of the rotor blades there might be a need to support the rotor blades. Such a support can be done by placing blocks of, e.g., expanded polystyrene or other suitable material under the respective rotor blades.

A nacelle stand according to the invention can comprise at least six or eight or more fingers, the fingers being arranged symmetrically to the longitudinal axis of the nacelle stand. By arranging a number of fingers in a symmetrical way, the nacelle stand will be able to take up the specific loads if the main frame of the nacelle is tested with respect to the yaw system. By activating the yaw system for the purpose of testing it during assembly or after assembly of the nacelle, the loads induced by such a test can be handled no matter if the nacelle is moved in one or in another direction or even in a full 360 degrees or 720 degrees turn.

In a preferred embodiment of a nacelle stand according to the invention, at least one set of fingers is arranged detachable to the center part, the fingers and the center part comprising co-working fastening means. The fastening means can comprise bolts and nuts, but mainly bolts and nuts will only be used to secure the position and not to carry any loads from the nacelle or from the nacelle stand. The detachable fingers will typically be supported in the center part of the nacelle stand in up and down direction and also in the sideways direction, as the center part comprises a number of support tunnels—one for each finger—fitted to each admitting one of the fingers to be installed. Thus, the finger will be supported on all sides, and as the load is placed on the nacelle stand, the stresses induced in the fingers will be taken up by the fingers and the center part in common.

A nacelle stand according to the invention can comprise that the connecting means/flange at the midsection is horizontal, and thus, lies in a plane that is parallel to the plane of the bedplate. Having a horizontal flange for the yaw system of the nacelle to be installed offers the benefit that a test of the yaw system can be carried out without any risk of the mainframe of the nacelle hitting the ground, as would be the consequence with at least some of the known systems. The yaw system can be installed on the nacelle stand either together with or prior to installing the nacelle main frame and other yaw equipment. The complete control system for operating the yaw system such as, e.g., yaw motors and brakes can be installed and tested before installation of further components and also a final test can be carried out before the nacelle is leaving the workshop. One big advantage if fixing the nacelle to the nacelle stand at the yaw system is that the nacelle is installed in a manner that is directly comparable to the position the nacelle will be in when installed at a wind turbine tower. Thus, transport will take place without incurring any extreme loads on the nacelle or any of its parts, as it is held in the same position as when installed at a tower.

In one embodiment of a nacelle stand according to the invention, the connecting means/flange can be directly or indirectly connected to adjusting means, the adjusting means being arranged to tilt the connecting means/flange in a angle relative to horizontal, e.g., by adjusting the height of the midsection at at least one position. The angle can, e.g., have a size of 0 to 10 degrees, but will preferably be between 0 and 6 degrees. This is especially an advantage during installation of the generator, as this installation job becomes much easier when the flanges on the main shaft and on the main frame of the nacelle are vertical and when also the flanges on the generator unit are vertical.

By arranging a part of the midsection of the nacelle stand to be able to perform a height adjustment, e.g., by hydraulic cylinders or other suitable means, it becomes possible to tilt the flange any desirable angle. The midsection can comprise two sets of actuators that are connected to the bedplate at one end and to the connecting means/flange at the other end. The two sets of actuators will preferably be arranged at the front— and at the back—facing sides of the nacelle stand, and by extending the actuators at the back and retracting the actuators at the front of the nacelle stand, the connecting means/flange will be tilted about a transverse pivot axis. This solution will probably be the most attractive one, as the system will be tilting the flange about a balance axis. The main part of the load from the nacelle and from the generator will be carried at the pivot axis, and the rest will be carried by the actuators. A generator unit for a nacelle will typically weigh about 40 metric ton or even more, which is a factor of considerable importance when handling the generator unit during installation. After having installed the generator unit, the connecting means/flange can be leveled into horizontal position and further assembly and transport can be carried out with the nacelle in its design position.

In a preferred embodiment of a nacelle stand according to the invention, the midsection can be a cylindrical or frustoconical part, the midsection further comprising a manhole. A steel structure that more or less is similar to the top of a wind turbine tower exhibits the most relevant and reliable characteristics as the connecting means/flange between the nacelle stand and the yaw system of a nacelle will be supported in the most optimal manner. The flange will be fully and equally supported no matter in which position the main frame of the nacelle or the complete nacelle is positioned during assembly and/or test.

A nacelle stand according to the invention can, however, also be constructed with a midsection made from steel beams and with a solid top flange for installation of e.g., a yaw system. To be able to enter the nacelle via the midsection in the nacelle stand, the nacelle stand can comprise a manhole and an internal ladder that leads from the bottom of the nacelle stand and into the center of the nacelle. The nacelle stand can also comprise one or more platforms, the one or more platforms being installed at a certain height that will make assembly of the nacelle and the components of the nacelle easier.

A nacelle stand according to the invention can further comprise brackets for hydraulic jack-up equipment, the brackets being arranged at the center part and/or at some or at all the extending fingers. Preferably jack-up equipment will be installed on the detachable fingers as they extend the most to the side and thus create a distance and space for the equipment to be installed and operated without getting in contact with parts of the nacelle. The above mentioned jack-up equipment will also be possible to use to tilt the connecting means/flange on the nacelle stand. By doing a differentiated jack-up, e.g., by only jacking up one end of the nacelle stand, the flange as well as the rest of the nacelle stand will be inclined to horizontal, which will allow for a easier installation of a heavy generator unit.

A nacelle stand according to the invention can, in a preferred embodiment, comprise means for facilitating moving a nacelle stand and a nacelle during or after assembly, the means comprising wheels allowing the nacelle stand and the nacelle to be moved e.g., on tracks. Such wheels can be steel wheels suitable to run on a track as known from railroads, but also other kinds of wheels, rollers or the like can be used to facilitate moving of the nacelle stand. The mentioned means such as wheels or rollers can, e.g., be arranged to be removable and/or retractable in order to dismount or disengage during transport to make it easier to fixate the nacelle stand to a trailer or to the deck of a ship.

The invention further comprises a method for building and testing a nacelle for a wind turbine using a nacelle stand according to the above description. The method at least comprising the steps of:
  arranging a nacelle stand,
  installing at least a yaw system and/or other components on a flange on the nacelle stand,
  connecting the yaw system and/or other components to a power supply and to a control mechanism,
  activating a test program,
  verifying the results of the test program
  installing further components in, at, or of the nacelle.

The method for building and testing a nacelle for a wind turbine using a nacelle stand can even further comprise the steps of:
  a transporting the nacelle stand and the nacelle to an installation/erection site,
  installing blades to the nacelle,
  testing mechanical equipment in/on the blades e.g., pitch mechanisms in the blades,
  detaching the nacelle stand from the nacelle,
  hoisting the nacelle to a position on a tower for a wind turbine.

A nacelle stand and a method as described above covers all the needs during assembly, test and installation, and the nacelle stand will follow a nacelle from the first assembly steps and until it is hoisted to the top of a wind turbine tower. After the nacelle stand has been dismounted from the nacelle, e.g., at the erection site, the detachable parts/fingers of the nacelle stand can be dismounted, and the nacelle stand and the components thereof can be transported by truck back to the workshop and used for another nacelle.

An embodiment of the invention will now be described, by way of example only, with reference to the accompanying drawings.

DETAILED DESCRIPTION OF THE INVENTION

In the following text, the figures will be described one by one and the different parts and positions seen in the figures will be numbered with the same numbers in the different figures. Not all parts and positions indicated in a specific figure will necessarily be discussed together with that figure.

Figure 1:
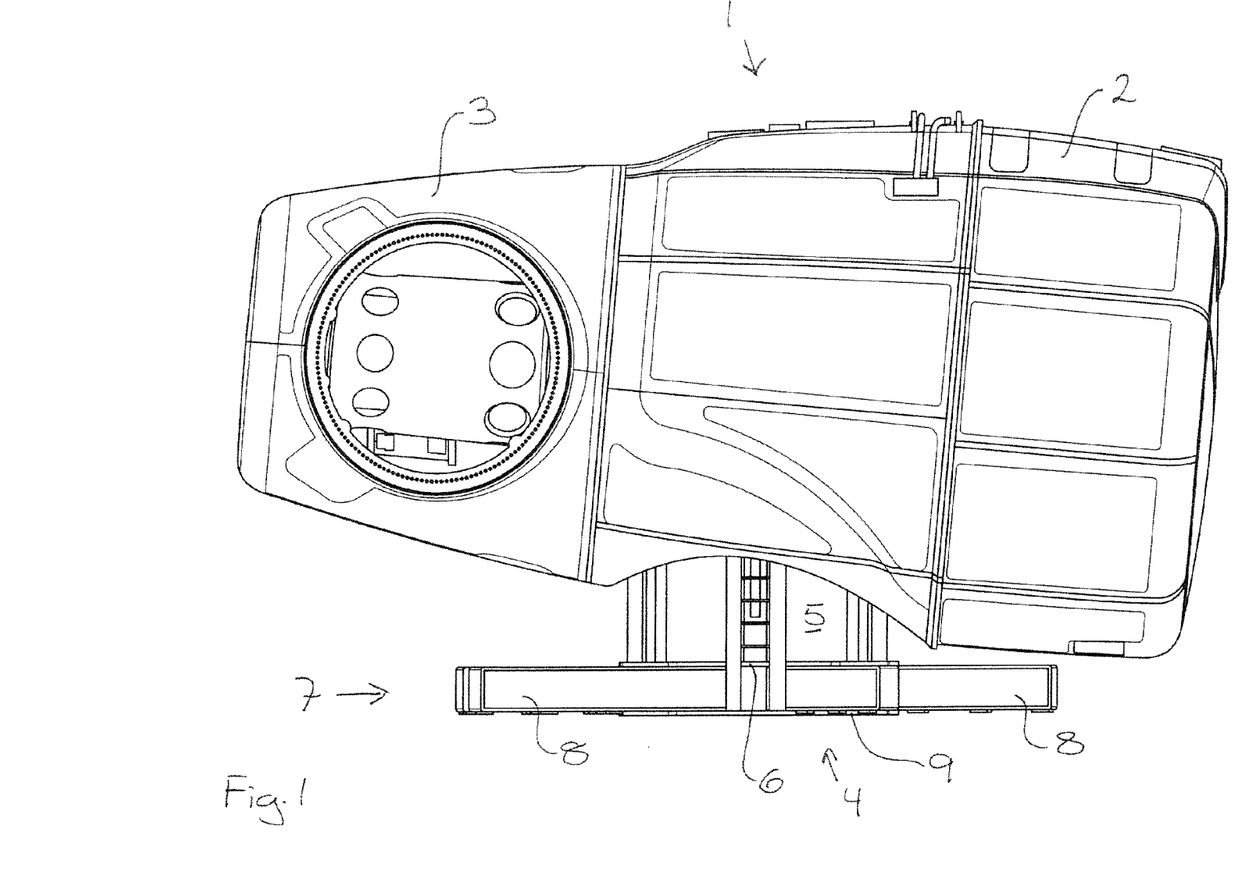
FIG. 1 is a side view of a nacelle on a nacelle stand.

In FIG. 1, a nacelle 1 with a generator end 2 and a hub end 3 is installed on a nacelle stand 4 and the lot is seen from the side with the hub end 3 facing to the left. The nacelle stand 4 comprises a midsection 5 with a ladder 6 installed on the side. The midsection 5 connects to the bedplate 7 of the nacelle stand 4. The bedplate 7 comprises a number of fingers 8 extending from a center part 9.

Figure 2:
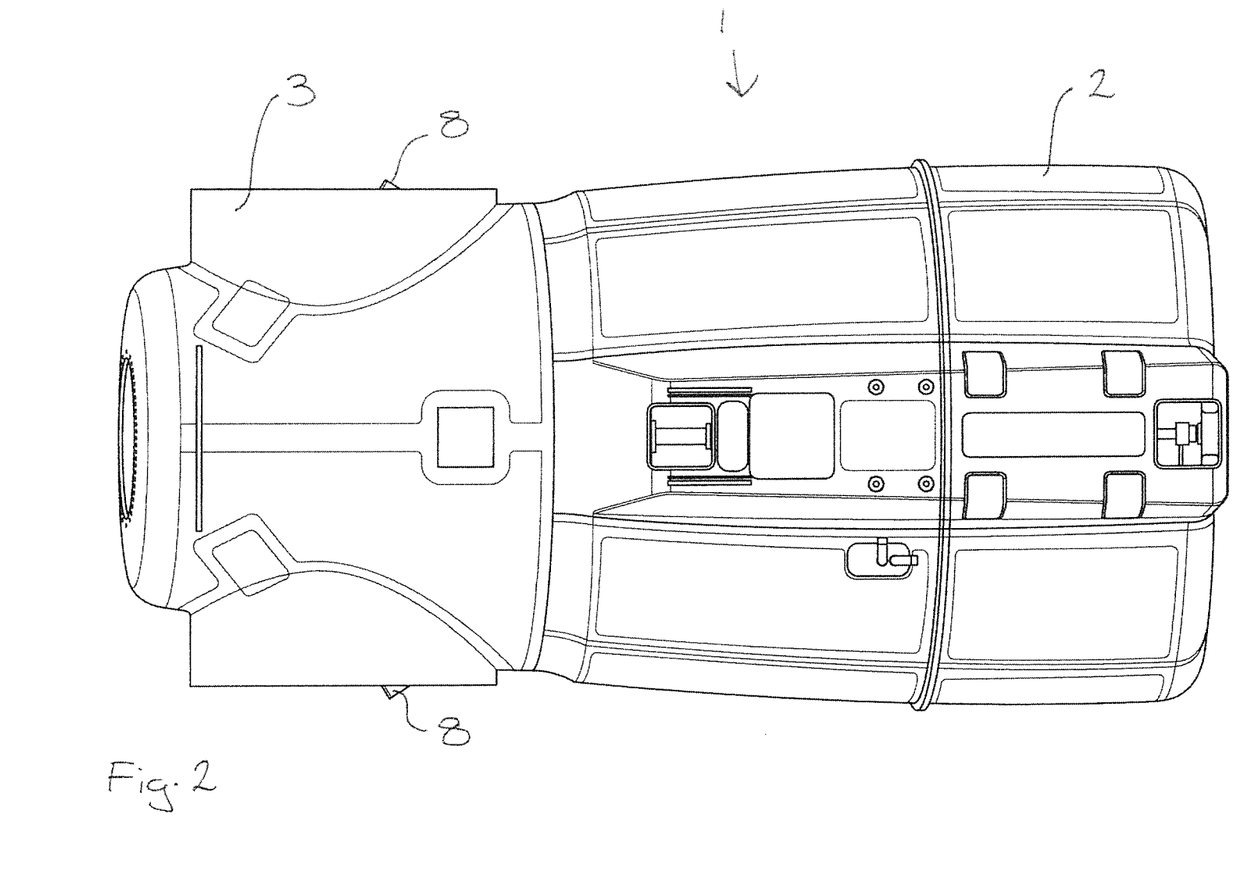
FIG. 2 is a top plan view of the nacelle on a nacelle stand.

FIG. 2 is a top view of the nacelle 1 on a nacelle stand 4 of FIG. 1, where only a very small tip of two fingers 8 extends outside the periphery of the complete nacelle 1. Having the nacelle stand 4 extending only within the periphery of the nacelle 1, allows a complete unit, comprising a nacelle stand 4 and a nacelle 1, to be stored or transported without taking up unnecessary space.

Figure 3:
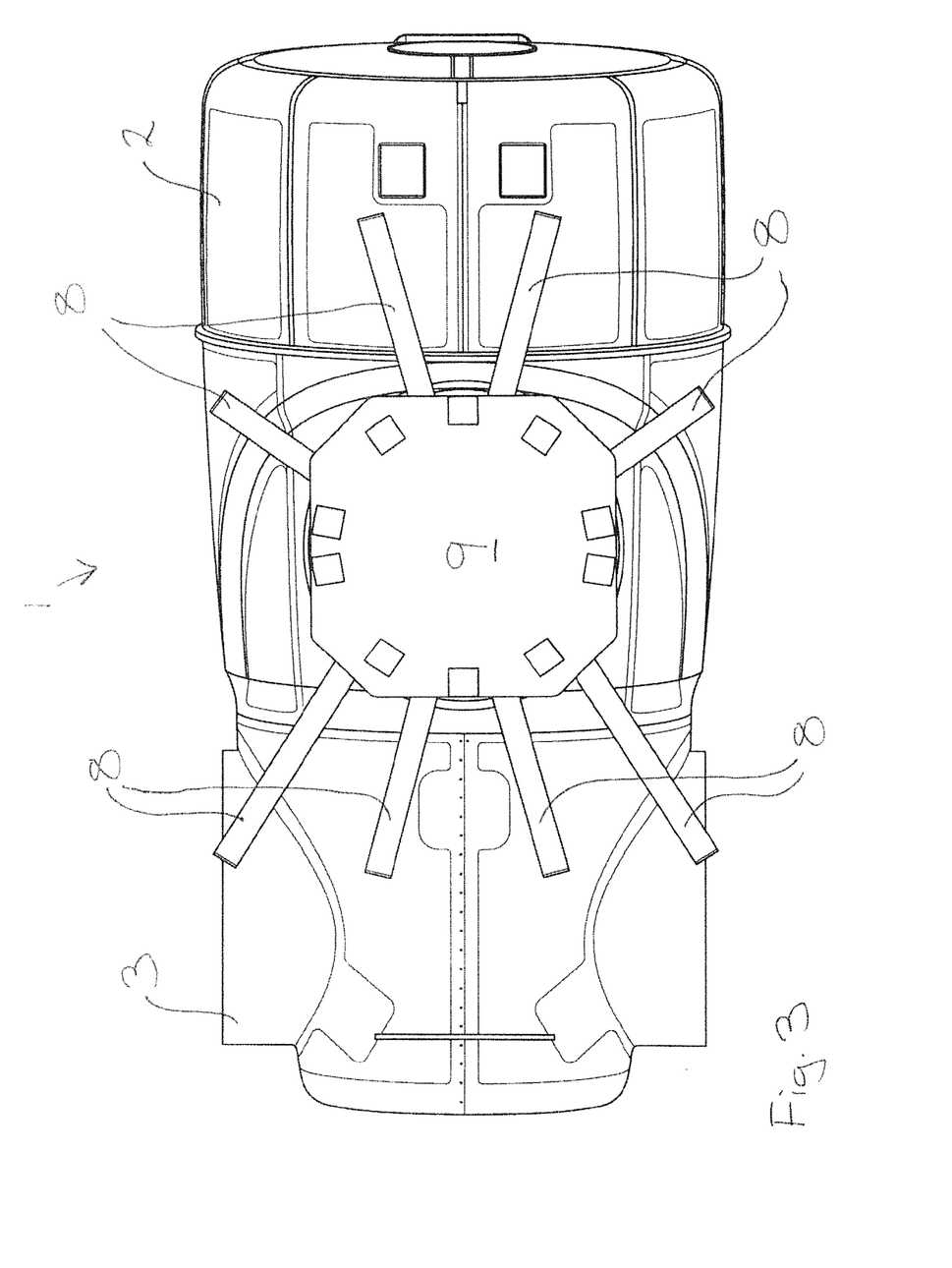
FIG. 3 is a bottom plan view of the nacelle on a nacelle stand seen.

FIG. 3 is a bottom view of the nacelle 1 on nacelle stand 4. From this angle, it is clearly seen that the nacelle stand 4 comprises a center part 9 and that four fingers 8 are extending more or less in the same direction as the hub end 3, and that four other fingers 8 are extending more or less in the same direction as the generator end 2 of the nacelle 1. The center part 9 is designed as a central foot for the nacelle stand 4, the foot being supported by the fingers 8, in order for the nacelle stand 4 to take up the load from the nacelle 1 and give a stable support.

Figure 4:
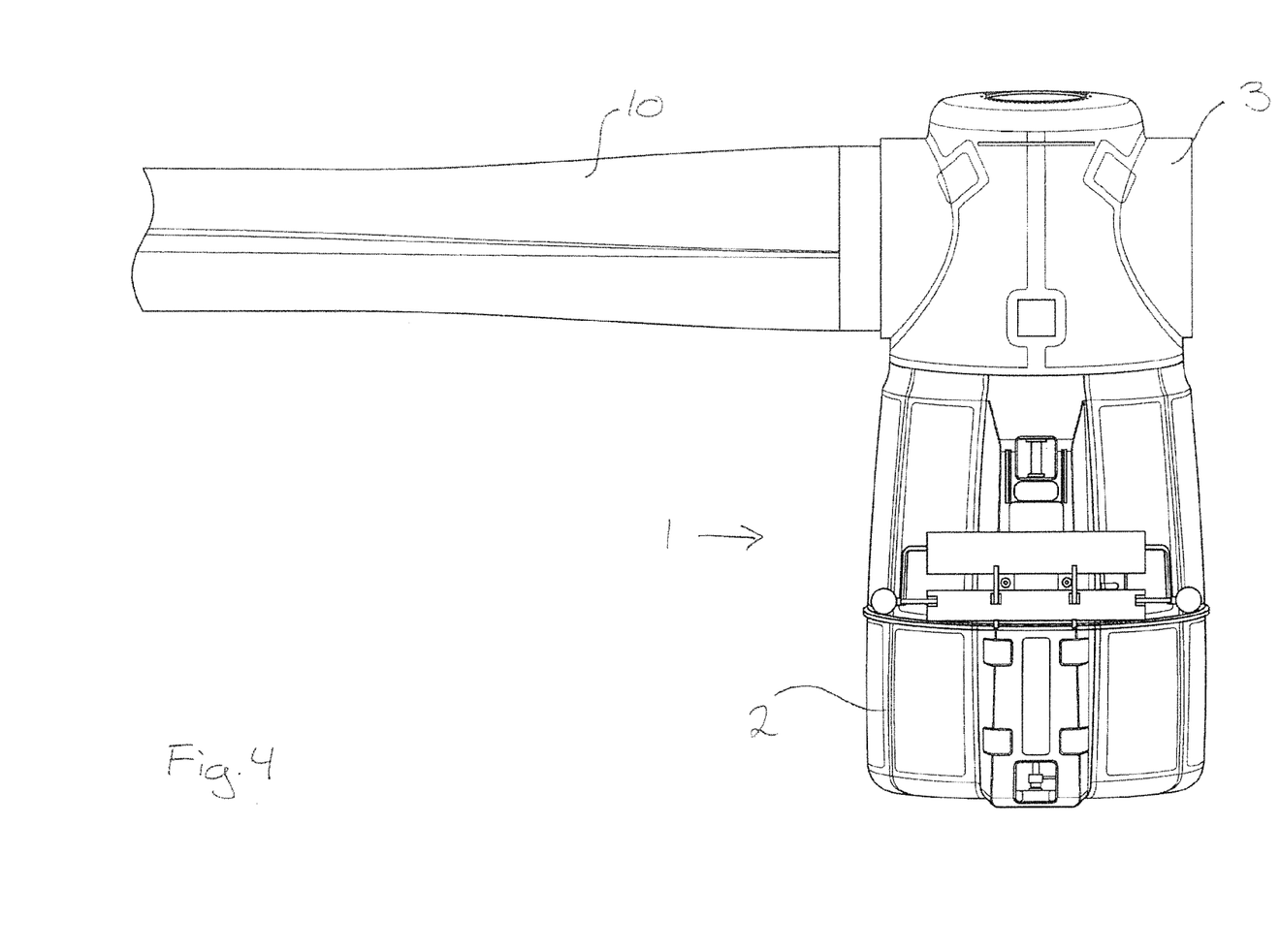
FIG. 4 is a top plan view of a nacelle on a nacelle stand with one rotor blade installed.

FIG. 4 shows a nacelle 1 on a nacelle stand 4 seen from the top and with one rotor blade 10 installed at the hub end 3. This is a typical situation while installing the rotor blades at the hub end 3 at an erection site. The rotor blade 10 will be supported during installation by a crane, or the rotor blade can be placed on top of a number of blocks or other kinds of support means during installation and until the nacelle 1 including the rotor blades is hoisted to the top of the wind turbine tower. This way of installing rotor blades 10 is very well suited for wind turbines with two blades, as the installation process is taking place in a horizontal plane which allows for installation of the blades without the need to hoist the nacelle as with rotors with three rotor blades.

Figure 5:
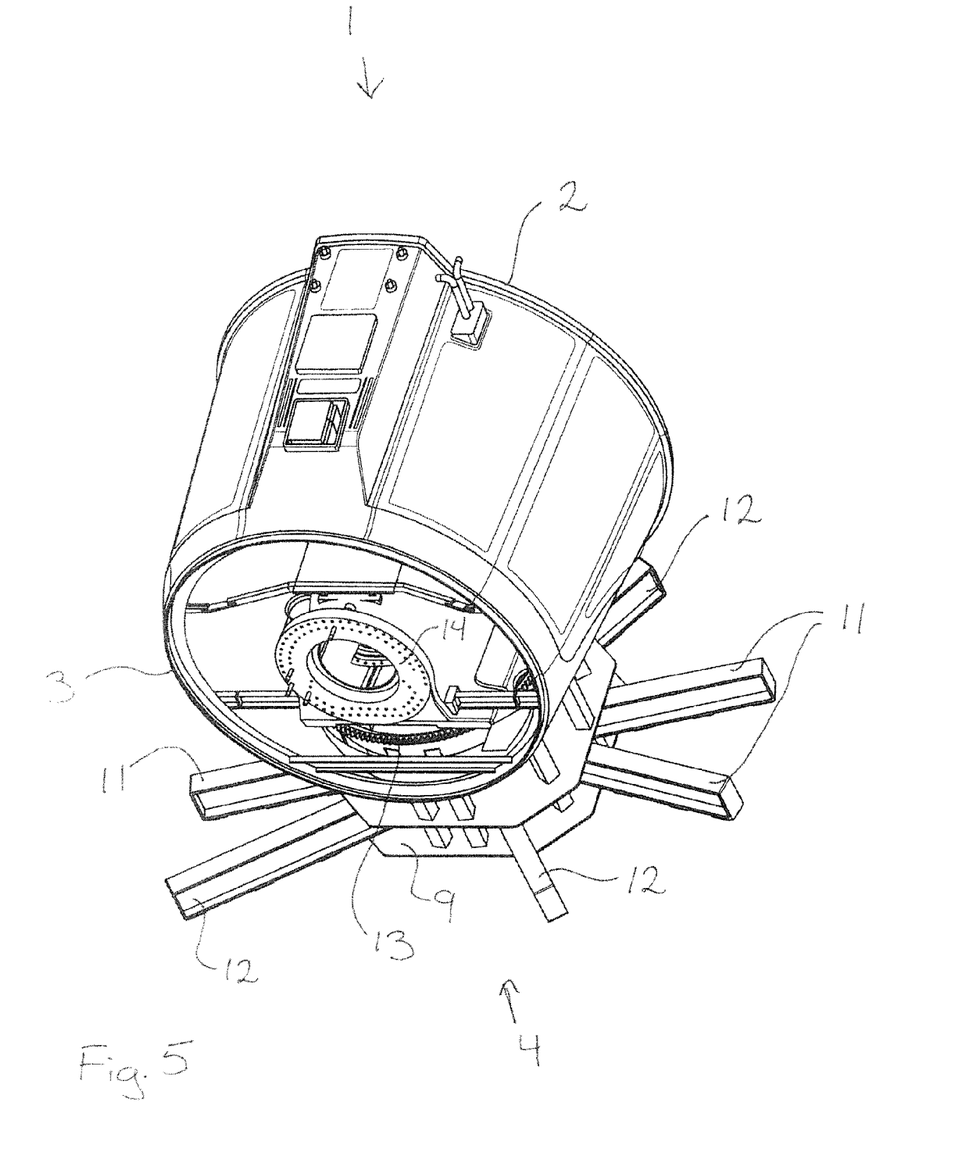
FIG. 5 is a perspective view of a partially assembled nacelle on a nacelle stand during testing.

FIG. 5 shows a partly assembled nacelle 1 on a nacelle stand 4 during testing of the yaw system 13. The nacelle 1 is turned approximately 90 degrees to the left in relation to its normal position on the nacelle stand 4. This can be done to test the yaw system 13 as mentioned, but also in order to do other types of tests or in order to install other parts more easily. To be able to rotate the nacelle 1 into exactly the most suitable position and to carry out tests during installation and also final tests before the nacelle 1 leaves the workshop is a great benefit that this solution offers. At the hub end 3 of the nacelle 1, the installation flange 14 for a hub shaft (not shown) is seen. As also seen in FIG. 3, the nacelle stand 4 comprises eight fingers 8, 11, 12. The two central fingers 8 on each side of the nacelle stand 4 are stationary fingers 11, and the two fingers 8 at each end of the nacelle stand 4 are detachable fingers 12.

Figure 6:
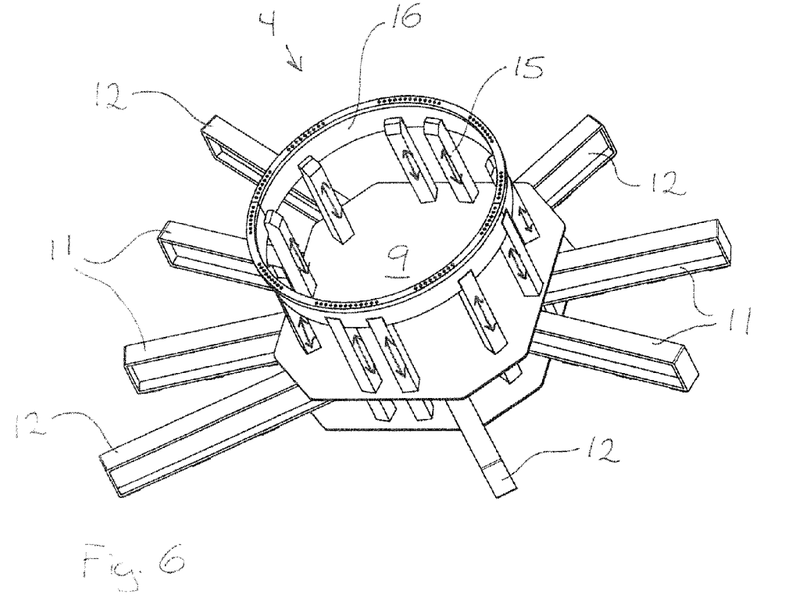
FIG. 6 is a perspective view of a nacelle stand in a construction of beams.

FIG. 6 shows a nacelle stand 4 having vertical beams 15 that connect the center part 9 with the connecting means/flange 16. The connecting means/flange 16 has the same shape and dimensions as the top flange at a wind turbine tower and allows for the yaw system 13 to be installed hereto. The nacelle stand 4 has a certain height that makes it possible to assemble the nacelle 1 at the nacelle stand 4 and still have some ground clearance as seen in FIG. 1. In FIG. 6 all the stationary fingers 11 and all the detachable fingers 12 are seen.

The vertical beams 15 can be replaced by actuators, e.g., hydraulic actuators/cylinders that allow the connecting means/flange 16 to be tilted 0 to 10 degrees in relation to horizontal, as seen in this figure. This allows for an easier installation of the complete generator unit/end 2 as the flanges on the parts can be brought into a vertical position. As a generator unit easily can have a weight of 40 metric ton or even more, this is very attractive as the handling becomes much easier. In FIG. 6 the actuators or their movement have been illustrated by double arrows on the vertical beams 15.

Figure 7:
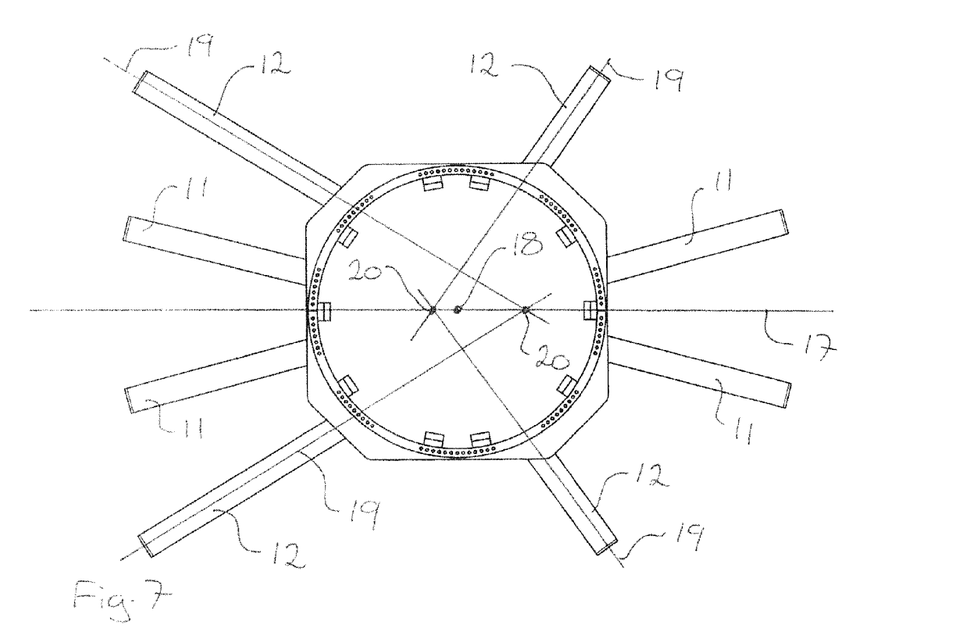
FIG. 7 is a top plan view of the nacelle stand in FIG. 6.

In FIG. 7, the nacelle stand 4 is seen directly from the above, and the longitudinal axis 17 of the bedplate 7 is seen. Also a vertical axis 18 is seen—as a dot—in the center part 9 of the bedplate 7. The longitudinal axes 19 of the detachable fingers 12 intersect the longitudinal axis 17 of the bed plate 7 at intersections 20 behind the vertical axis 18. The stationary fingers 11 intersect at the vertical axis 18 in the center of the center part 9. Thus, there is a solid support of the nacelle more or less directly under the center of gravity of the nacelle 1.

Figure 8:
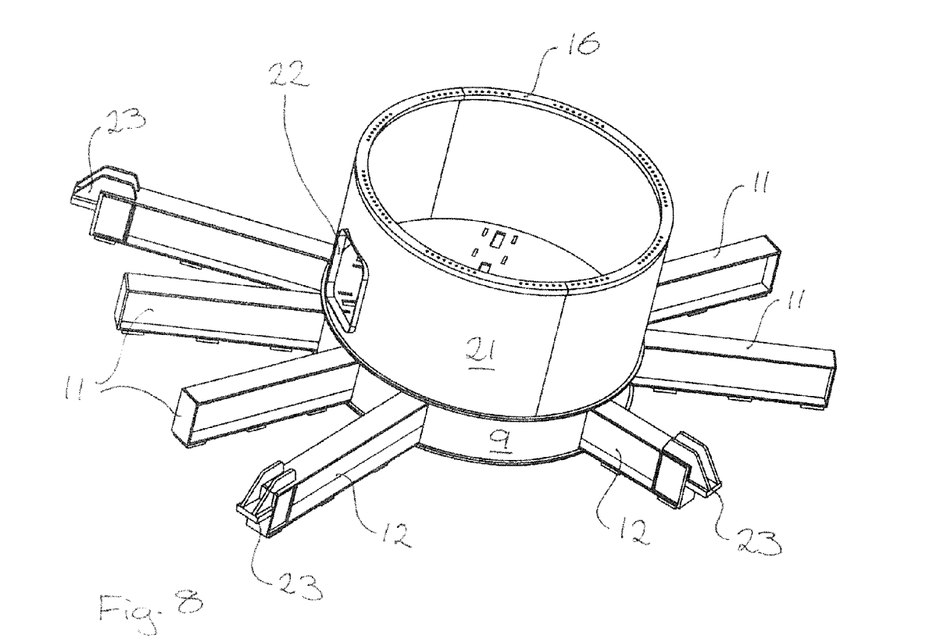
FIG. 8 is a perspective view of a nacelle stand with a cylindrical midsection.

FIG. 8 shows a nacelle stand 4 with a cylindrical midsection 21 that connects the center part 9 with the connecting means/flange 16 at the top of the nacelle stand 4. In the sidewall of the cylindrical midsection 21 there is arranged a manhole 22, that allows a worker to enter the nacelle stand 4 and also the nacelle 1 or at least the yaw system at the bottom of the nacelle 1. The stationary fingers 11 are as seen in the previous figures, but the detachable fingers 12 are equipped with brackets 23 for jack-up equipment, that will allow the nacelle stand 4 to be lifted from the ground for any possible purpose, e.g., to load the nacelle stand 4 and a nacelle 1 onto a trailer 24. The brackets 23 as seen in the figure can also be designed to comprise detachable wheels that will allow the nacelle stand to be moved on a floor or on a set of tracks during the time that the nacelle stand 4 is in a workshop. Such wheels can also be arranged on the other fingers 8 and at other suitable locations on the nacelle stand 4.

Figure 9:
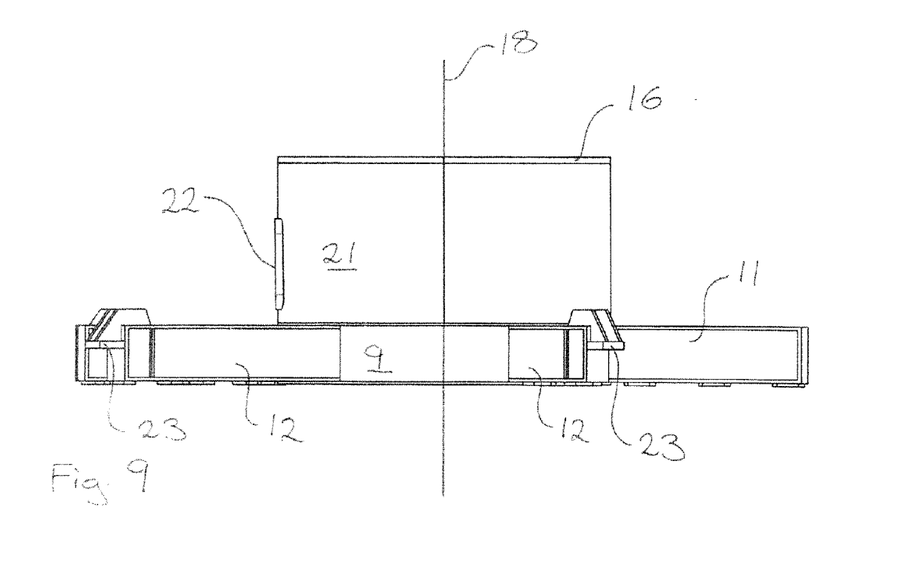
FIG. 9 is a side view of the nacelle stand in FIG. 8.

FIG. 9 shows the same nacelle stand 4 as seen in FIG. 8, but from the side where the vertical axis 18 as described above is seen.

Figure 10:
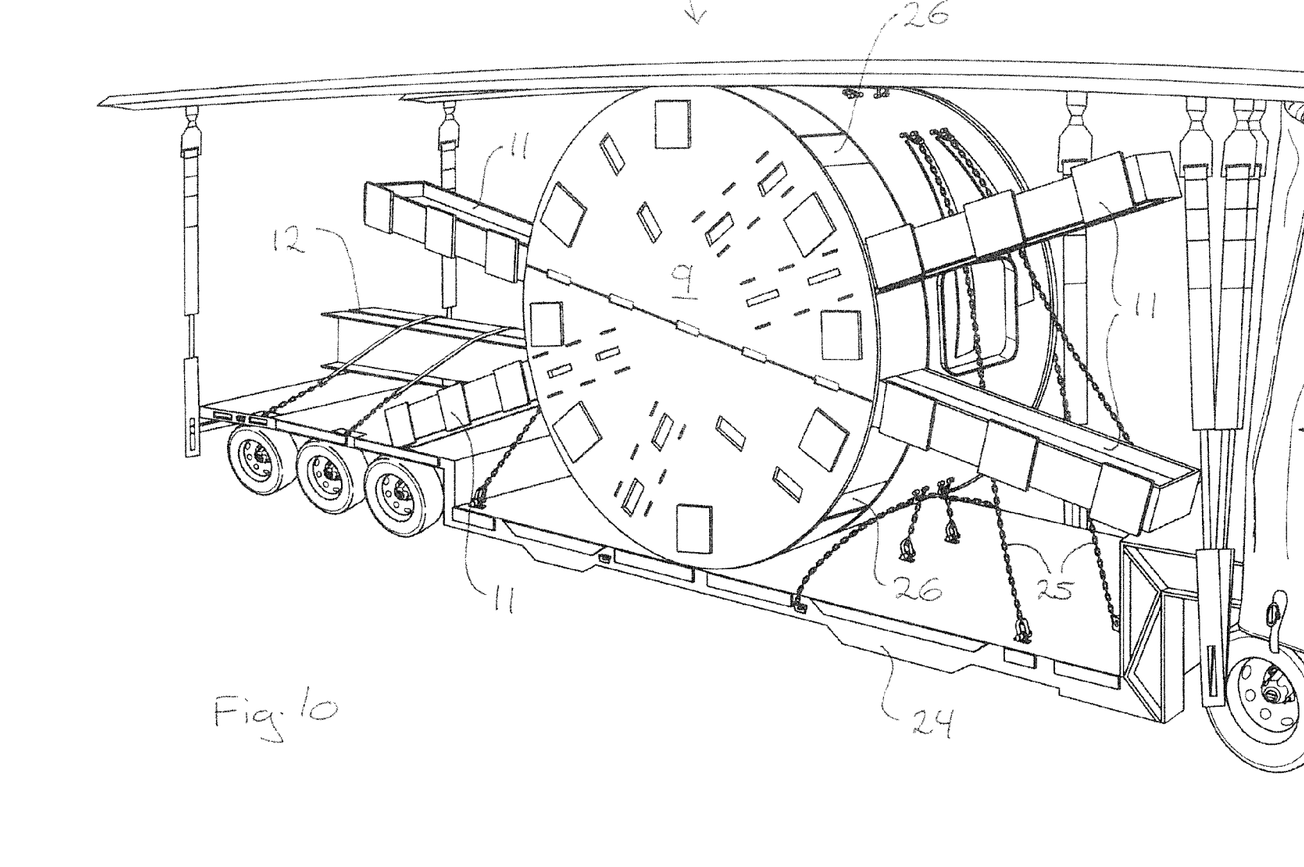
FIG. 10 is a side perspective view of the nacelle stand on a trailer.

In FIG. 10, the nacelle stand 4 is seen from the bottom on a trailer 24 lying on the side. The nacelle stand is fixed to the trailer by a number of cargo lashings 25. The stationary fingers 11 extend in the length of the trailer 24 and the detachable fingers 12 are detached and are placed behind the nacelle stand 4. In this figure, two of the openings 26 for the detachable fingers 12 are seen.

Figure 11:
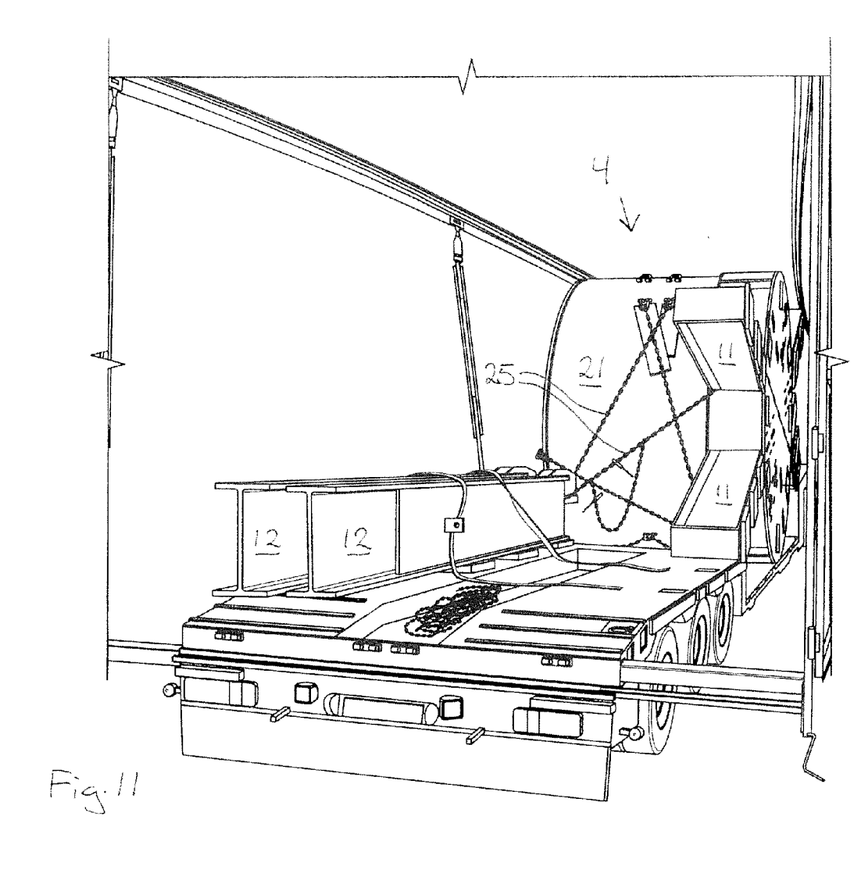
FIG. 11 is a rear perspective view of the nacelle stand.

Finally, FIG. 11 shows the nacelle stand 4 on a trailer 24 from the rear end of the trailer 24. From this angle, it is clearly seen that a nacelle stand 4 can be transported on a trailer 24 from an erection site and back to a workshop for further use. By detaching the detachable fingers 12, the nacelle stand 4 becomes much easier to handle.

The invention is not limited to the embodiments described herein, and may be modified or adapted without departing from the scope of the present invention as described in the patent claims below.

What is claimed is:

1. A nacelle stand suitable for supporting a nacelle for a wind turbine during manufacturing and assembly of the nacelle, and during transport, the nacelle comprising a main frame suitable for installation of a number of components, a main shaft, a hub comprising a number of blades and a yaw system, the nacelle stand comprising a first longitudinal axis and a traverse axis, connecting means arranged for rigid connection to the yaw system, said yaw system being arranged at the main frame, the nacelle further comprising a nacelle cover extending over said main frame and over components installed on the main frame, the nacelle stand further comprising, at least a midsection having a vertical centerline, the midsection being arranged between the connecting means and a bedplate, the bedplate extending in a first horizontal plane and comprising a center part and a plurality of fingers extending away from the center part in the first horizontal plane, the fingers each having an angle larger than 0 degrees and less than 90 degrees relative to said longitudinal axis.

2. A nacelle stand according to claim 1, wherein the nacelle stand comprises two sets of fingers, each of the sets of fingers extending outward relative to the vertical centerline of the midsection.

3. A nacelle stand according to claim 2, wherein the nacelle stand further comprises at least one additional set of fingers that comprises at least two fingers, each of which extends away from the center part and each of which has a second longitudinal axis, the second longitudinal axes intersecting the vertical centerline of the midsection.

4. A nacelle stand according to claim 2, wherein at least one set of fingers is detachably connected to the center part by fastening means.

5. A nacelle stand according to claim 2, wherein each of said sets comprises at least two fingers, each of which extends away from the center part in a direction towards a generator end or a hub end of the nacelle, each of which has a second longitudinal axis in intersecting the first longitudinal axis of the nacelle stand at an intersection located towards and opposite end of the nacelle.

6. A nacelle stand according to claim 1, wherein the nacelle stand comprises at least six fingers, the fingers being arranged symmetrically relative to the first longitudinal axis of the nacelle stand.

7. A nacelle stand according to claim 1, wherein the connecting means is arranged in a second horizontal plane at said midsection, the second horizontal plane being arranged parallel to the first horizontal plane and to the bedplate.

8. A nacelle stand according to claim 7, wherein the connecting means is connected to adjusting means of the midsection, the adjusting means being arranged for tilting the connecting means in an angle relative to the first horizontal plane.

9. A nacelle stand according to claim 1, wherein the connecting means is connected to adjusting means of the midsection, the adjusting means being arranged for tilting the connecting means in an angle relative to the first horizontal plane.

10. A nacelle stand according to claim 9, wherein the adjusting means being arranged to tilt the connecting means by adjusting the height of the midsection at at least one position.

11. A nacelle stand according to claim 1, wherein the midsection is a cylindrical or frusto-conical part and comprises a manhole.

12. A nacelle stand according to claim 1, wherein the nacelle stand further comprising brackets for hydraulic jack-up equipment, the brackets being arranged at the center part.

13. A nacelle stand according to claim 1, wherein the nacelle stand further comprising means for facilitating moving the nacelle stand with a nacelle thereon during or after assembly, the means for facilitating comprising wheels.

14. Method for building and testing a nacelle for a wind turbine using a nacelle stand comprising the steps of:
    providing a nacelle stand comprising a first longitudinal axis and a traverse axis and connecting means arranged for rigid connection to a yaw system, the nacelle stand further comprising at least a midsection having a vertical centerline, the midsection being arranged between the connecting means and a bedplate, the bedplate extending in a first horizontal plane and comprising a center part and a plurality of fingers extending away from the center part in the first horizontal plane, the fingers each having an angle larger than 0 degrees and less than 90 degrees relative to said first longitudinal axis,
    installing at least one of a yaw system and other components of a nacelle on a flange on the nacelle stand,
    connecting said at least one of a yaw system and other components to a power supply and to a control mechanism,
    activating a test program,
    verifying the results of the test program
    installing further components in, at or of the nacelle,
    transporting the nacelle stand and the nacelle to an installation site,
    installing blades on the nacelle,
    testing mechanical equipment of the blades,
    detaching the nacelle stand from the nacelle,
    hoisting the nacelle to a position on a tower for a wind turbine.

* * * * *